United States Patent [19]
Zhang et al.

[11] Patent Number: 5,347,456
[45] Date of Patent: Sep. 13, 1994

[54] INTELLIGENT ROADWAY REFERENCE SYSTEM FOR VEHICLE LATERAL GUIDANCE AND CONTROL

[75] Inventors: Wei-bin Zhang, Richmond; Robert E. Parsons, Walnut Creek, both of Calif.

[73] Assignee: The Regents of the University of California, Oakland, Calif.

[21] Appl. No.: 704,294

[22] Filed: May 22, 1991

[51] Int. Cl.$^5$ .................. G05D 1/03; G06F 15/50
[52] U.S. Cl. .................. 364/424.02; 180/168
[58] Field of Search .................. 364/424.02, 138, 146; 180/168, 167, 169; 318/568.12

[56] References Cited

U.S. PATENT DOCUMENTS

| | | | |
|---|---|---|---|
| 4,043,418 | 8/1977 | Blakeslee | 180/98 |
| 4,278,142 | 7/1981 | Kono | 180/168 |
| 4,307,329 | 12/1981 | Taylor | 318/587 |
| 4,307,791 | 12/1981 | De Bruine | 180/168 |
| 4,472,716 | 9/1984 | Hansen | 340/905 |
| 4,524,314 | 6/1985 | Walker | 318/587 |
| 4,566,032 | 1/1986 | Hirooka et al. | 358/103 |
| 4,588,041 | 5/1986 | Tsuchiheshi | 180/168 |
| 4,628,453 | 12/1986 | Kamejima et al. | 364/424 |
| 4,652,004 | 3/1987 | Wirth et al. | 180/168 |
| 4,680,715 | 7/1987 | Pawelek | 364/449 |
| 4,800,978 | 1/1989 | Wasa et al. | 180/168 |
| 4,847,774 | 7/1989 | Tomikawa et al. | 364/449 |
| 4,855,822 | 8/1989 | Narenda et al. | 358/103 |
| 4,890,233 | 12/1989 | Ando et al. | 364/457 |
| 4,908,557 | 3/1990 | Sudare et al. | 318/587 |
| 4,990,841 | 2/1991 | Elder | 318/587 |
| 5,000,279 | 3/1991 | Kondo et al. | 180/168 |
| 5,163,001 | 11/1992 | Luke, Jr. | 364/424.02 |
| 5,191,528 | 3/1993 | Yardley et al. | 364/424.02 |

OTHER PUBLICATIONS

Lawrence; *A Magnetic Signpost AVM System with Limited Dead Reckoning;* IEEE Transactions on Vehicular Technology Vo AT-26, Feb. 1977.
Johnston et al; *Automated Vehicle Guidance Using Discrete Reference Markers;* IEEE Transactions on Vehicular Technology Vol. AT-27, Feb. 1979.
Parsons et al; *Program on Advanced Technology for Highway Lateral Guidance System;* ATT Conf., Feb. 1989.
Fenton; *Technologies for Individual Vehicle Control* Proceedings of Technology Options for Highway Transportation Operation UC Berkeley, UCP-ITS-P-87, Oct. 1986.
Dobrotin et al.; *Fully Automated Urban Traffic System*, DOT Report DOT-TST-78-E, Dec., 1977.

Primary Examiner—Thomas G. Black
Assistant Examiner—Susan Wieland
Attorney, Agent, or Firm—Phillips, Moore, Lempio & Finley

[57] ABSTRACT

An intelligent vehicle highway system requires a multifunctional roadway reference system to help the vehicle locate its lateral and longitudinal position along a highway. This information at a minimum is required to control the vehicle. The present invention consists of a roadway reference system in which discrete markers installed in the center of a traffic lane code one or more bits of information. An on-board sensing system acquires the information when the vehicle passes over the reference markers and thereby determines vehicle deviation and upcoming road geometry. Other coded information may be provided through the passive discrete markers to include such items as geographical position, warning of future conditions and the like.

29 Claims, 8 Drawing Sheets

INTELLIGENT ROADWAY REFERENCE SYSTEM FOR VEHICLE LATERAL GUIDANCE AND CONTROL

BACKGROUND OF THE INVENTION

Automated vehicle control over a highway or pathway has long been desirable. In the simplest application, the warehouse setting, such systems are relatively common. In existing systems utilized in warehouses and offices, a vehicle is usually guided over a desired path by sensing an electric current, or sensing a magnetic field. Other systems include optical sensing, radar, acoustic or video sensing systems. All of these systems are for relatively slow vehicles as they merely react to changes in direction. Each of the aforesaid systems include serious drawbacks to the development of a control system for use in a relatively high speed highway situation.

Generally stated, existing systems sense the vehicle's position relative to a desired pathway, usually the center line of the desired track, and then compensate for the vehicle being off the pathway. As a consequence, for a smooth ride the vehicle is limited to a relatively slow speed because there is no indication as to the upcoming road or path geometry. Further drawbacks particularly associated with electro magnetic systems wherein a cable is buried or located in the path, include power requirements to maintain a current in the cable. In particular power loss in the cable requires infusion of power along the pathway even in relatively short systems. Further should the cable be broken or should it become necessary to relocate the path, at least the broken section of the cable must be taken out of the pathway and the cable repositioned or relocated at some expense to the user. Finally, it has been found that insects such as termites will eat the insulation off buried cables resulting in the system shorting out. In the case of the optical systems, where a reflective path is placed in the center line of the desired track, the path may become dirty over a period of time and thus degrade operation of the system.

Existing electro-magnetic systems usually use a plurality of sensors, up to seven, mounted transversely across the vehicle to determine the track deviation. Most commonly the sensors are coil type, however, in some instances magnetometers have been used.

While radar sensing is possible along with sonar or sound sensing, one is limited in correctly reading and interpreting radar or sonar echoes to insure obstacles are avoided and turns are made properly. Video sensing techniques based on current technology, using video cameras, may operate satisfactorily in daylight and in periods of good visibility but at night and in periods of poor visibility video systems are of little or no value. Even in good visibility, video sensing systems must correctly interpret the video return. At least one echo sensing system uses a "side looking" system requiring a wall along one side of the path.

One advantage of video, radar and acoustic sensing techniques include the ability to "predict" upcoming road geometry and possibly smooth some of the vehicle corrections to maintain the desired path, however terrain recognition remains a limiting factor.

All existing systems suffer from insufficient intelligence on upcoming road geometry thus these present systems usually "react" to an off course signal when a turn occurs rather than "planning" ahead.

These different approaches may be characterized as "direct" sensing and "indirect" sensing. In direct sensing, the capabilities could include a "smart" on-board sensing system that could objectively or directly "perceive" the road geometry and the vehicle state thereby not requiring a specially designed roadway. On the other hand, an on-board sensing system that could read both vehicle state and road information indirectly from a specially designed roadway or roadside information system may be characterized as the "indirect" sensing approach.

The direct sensing approach can be analogized to video sensing which utilizes a video camera to sense the image of the upcoming road frame by frame. The data is processed and analyzed using an image processing technique. In the indirect sensing approach on the other hand, road geometry information is abstracted by several characteristic parameters and then stored in a roadway or roadside information system. Both the vehicle state and road information can be interrogated via on-board vehicle sensors or communications tools.

While the advantages of a direct sensing approach are fairly obvious, since the system essentially replicates human driving perception, it is limited by the fact that computer and image processing techniques are difficult to accomplish in "real time" using a practical size computer. On the other hand, the indirect sensing approach provides a relatively easy means of acquiring required road information as well as vehicle position relative to the center line of the desired path (lateral deviation).

In the interrogation of roadside references for stored information, only limited information need be transmitted to the vehicle, thus the amount of data to be processed is minimized. Therefore, both the on-board sensors and the roadway reference systems can be reasonably simple and economical for a large scale operation. Finally, due to the serial nature of the data, operation at relatively high speeds (80-120 km/hour) is possible. In short, it is an object of this invention to provide an indirect sensing system for vehicle control.

It is a further object of this invention to provide an indirect sensing system that provides roadway geometry or characteristics to the vehicle.

It is still another object of this invention to provide a control system in the vehicle that is responsive to both lateral deviation from a pathway obtained from the indirect sensing system and responsive to roadway characteristics which may be contained in the roadway or roadside reference systems.

It is a further object of this invention to provide an economical vehicle guidance/control system.

It is an object of this invention to provide a vehicle guidance and control system where roadway geometry information is permanently embedded in the pavement and further the roadway geometry information is safe in that it is not dependant on any outside power source.

It is still another object of this invention to provide a vehicle guidance and control system that effectively eliminates variations in signal interpretation from vertical movement caused by vehicle bounce.

It is also an object of this invention to provide a vehicle guidance and control system that based on interpreted roadway geometry provides steering signals either to a vehicle operator by way of a display or alternatively provides steering signals to the vehicle steering mechanism.

It is still another object of this invention to provide a roadway guidance/control system wherein the pathway may be readily altered.

It is another object of this invention to provide a roadway vehicle guidance/control system that utilizes passive markers.

It is still another object of this invention to provide a vehicle roadway guidance/control system wherein the passive markers may be serially oriented so that a binary code is formed by passage over the passive markers.

SUMMARY OF THE INVENTION

This invention is a vehicle direction sensing system for use with discreet magnetic markers wherein each magnetic marker, having a magnetic field associated therewith is embedded along a predetermined line in a pathway. The invention includes a first magnetic field strength sensing device positioned in the vehicle for determining the vertical component of the field strength of one of the discreet magnetic markers. Also included is a second magnetic field strength second sensing device positioned in the vehicle for determining the horizontal component of the field strength of the same one of the discreet magnetic markers. A computer is included for comparing the vertical component of the magnetic field strength and the horizontal component of the magnetic field strength of one of the markers to obtain the lateral deviation of the vehicle from the predetermined line.

DETAILED DESCRIPTION OF THE PREFERRED EMBODIMENT

Figure 1:
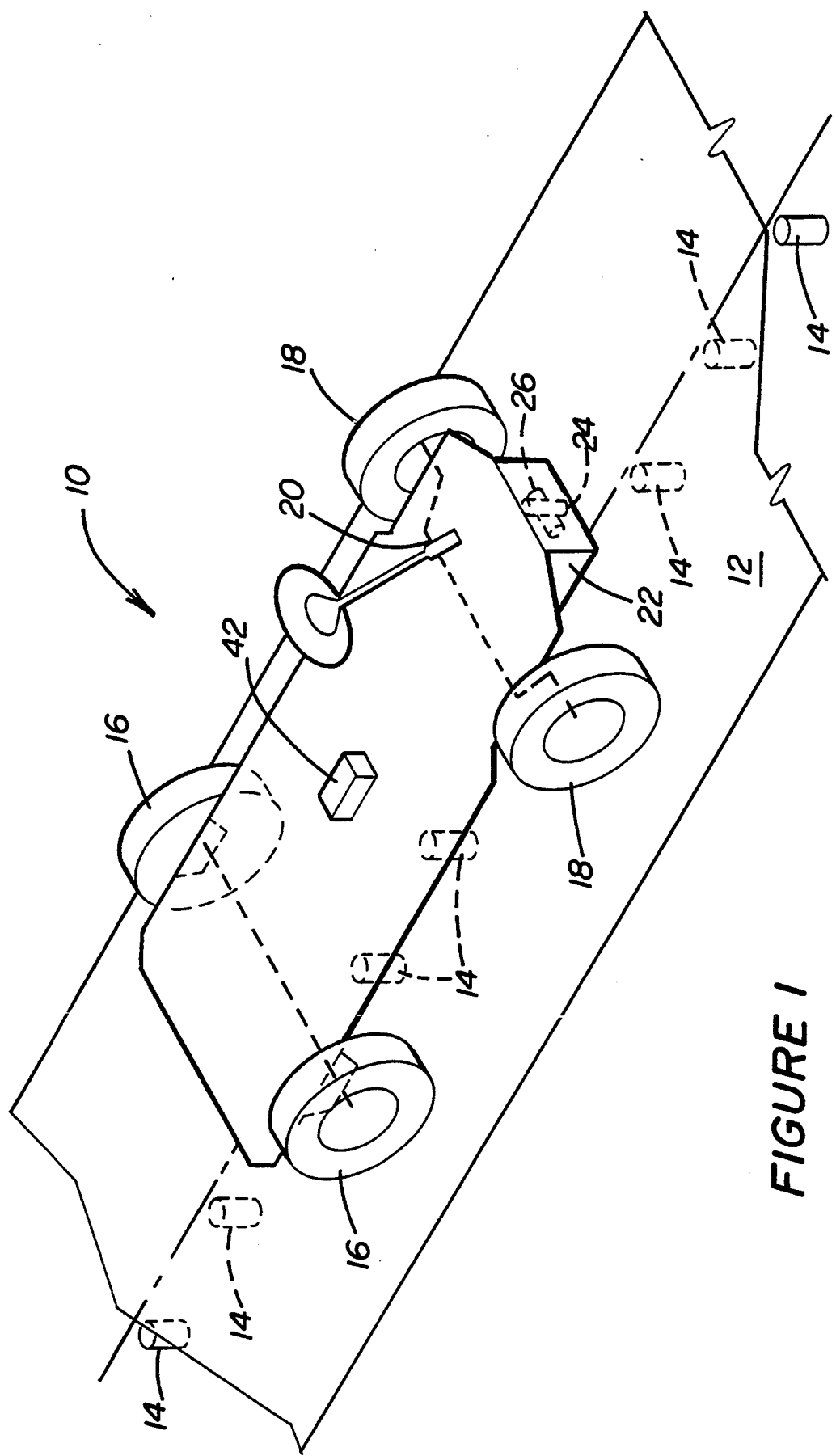
FIG. 1 is a schematic of a vehicle with the vehicle sensing system mounted therein traveling along a pathway with the markers embedded therein.

Referring to FIG. 1, a vehicle 10 is schematically shown in perspective. Vehicle 10 is shown on a roadway 12 that has embedded therein a series of magnets 14. Preferably magnets 14 are on the center line of the pathway although they may be adjacent to the side. By varying the orientation, that is whether the north or south pole is up in the vertically placed magnets, one can send "binary" information to a remote sensor by encoding "1's" and "0's" with the serially placed magnets. It will be seen that deviation is not degraded by such placement.

Vehicle 10 may be conventional in construction having two rear wheels 16 and two front wheels 18. The front wheels 18 are controllable by conventional steering mechanism 20 which may be operated by the vehicle operator in the manner of a private automobile or a truck. Vehicle 10 may be powered in the conventional manner by an internal combustion engine (not shown) or any other appropriate type of motive power. The drive may be accomplished through the rear wheels 16 or through the front wheels 18. Such configuration is not critical to the invention described herein and it is specifically pointed out that the invention described herein is applicable to any type of vehicle be it a four-wheel vehicle, a three-wheel vehicle or a multi-wheel vehicle. One portion of the invention deals with steering control of the vehicle hence the vehicle should be provided with steerable wheels. In the embodiment described, the front wheels are steerable. In the event the vehicle is a three-wheel vehicle then a single steerable type wheel could be used in lieu of a conventional rack and pinion steering mechanism of a four-wheel vehicle.

Having described the vehicle environment, it is appropriate to pass on to particular features of the invention. Located at or near the front of vehicle 10 is a sensing unit or sensor 22. Sensor 22 contains a pair of orthoganaly oriented probes 24 and 26 (see FIG. 3). The probes are preferably mounted in the center line of the vehicle and should be longitudinally adjacent one to the other, that is with one in front of the other. Other mounting positions on the vehicle are possible, so long as the orthoganally adjacent relation is maintained. For example if magnets are embedded near the side of the pathway, the sensor with its probes may be mounted at the side of the vehicle.

Figure 3:
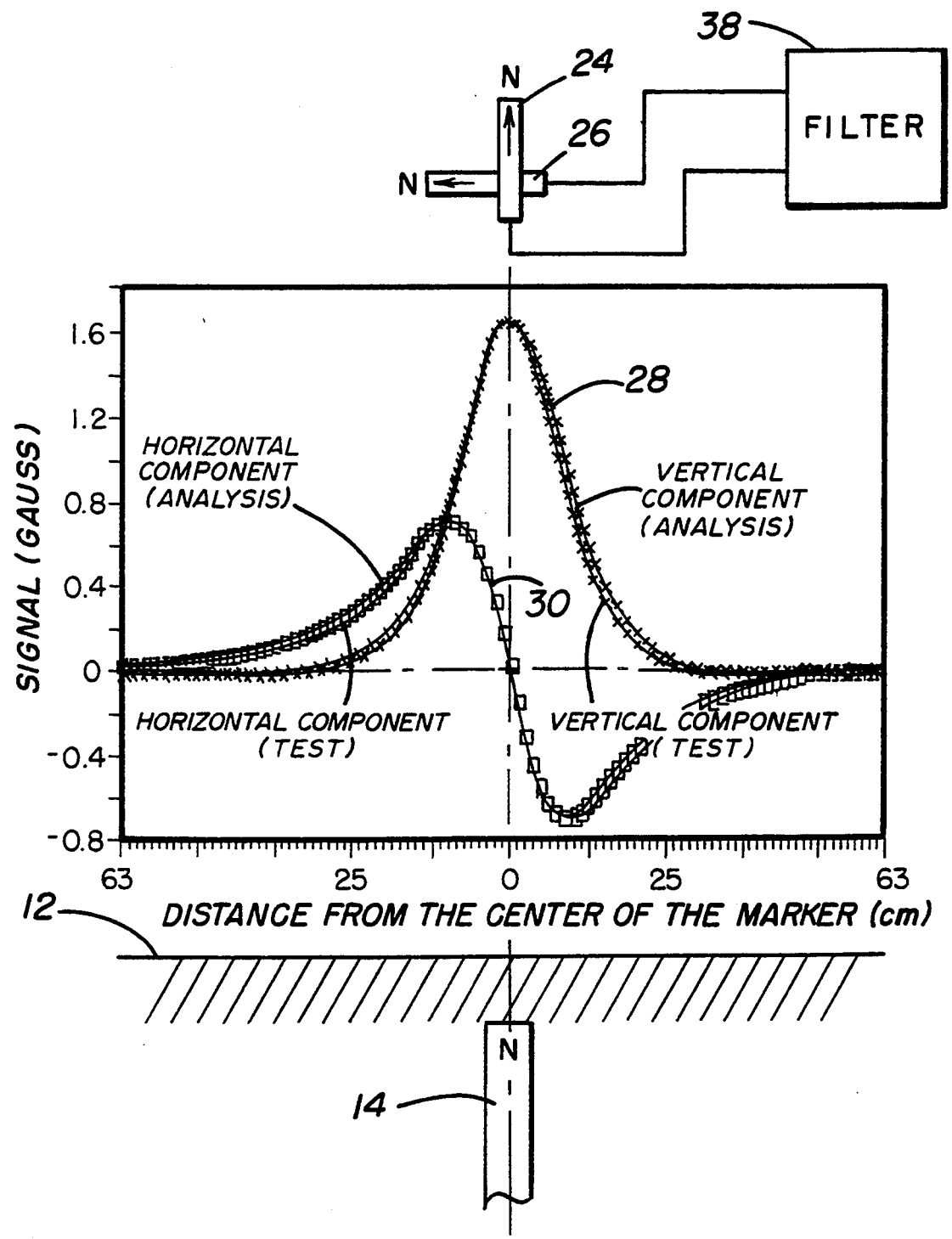
FIG. 3 is a graphical representation of the field strength of the horizontal and vertical field strengths of a magnetic marker embedded in the pavement of a pathway.

Probes 24 and 26 are magnetometers capable of sensing not only the force of a magnetic field but also the direction of the field. The probes or magnetometers are mounted so that one (24) is vertical relative to the roadway and the other (26) is mounted horizontally with its axis perpendicular to the direction of travel of the vehicle and therefore perpendicular to the path center line. It is noted in FIG. 3 that the horizontal probe 26 is oriented so that a positive indication would be indicated to the left for a north-type of polarity. In like manner polarity of probe 24 is upwardly on the paper thus the positive direction is up. In FIG. 3, a signal strength diagram is shown in a plane coincident with the axis of a imbedded magnet parallel to the axis of the magnetometer probes 24 and 26, and perpendicular to the center line of the roadway 12 along with the probes. It should be understood that the signal strengths determined by the probes are schematic but the importance of the field strength will become apparent in the ensuing discussion. It should also be understood that the graph shown in FIG. 3 is from experimental and empirical data and from analysis in a test.

Figure 3A:
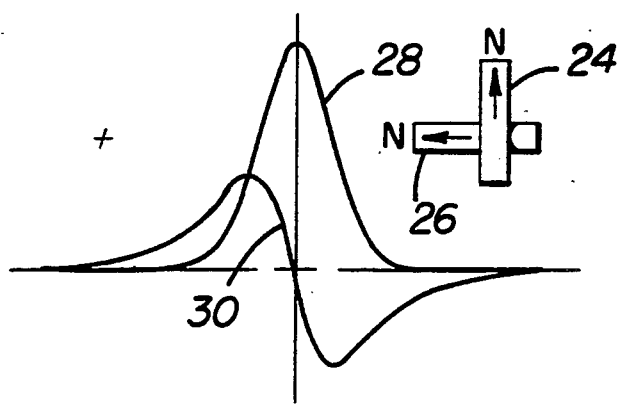
FIG. 3A is a representation of the force fields and the force vectors of a magnet placed with the north pole in the uppermost position.
Figure 3A:
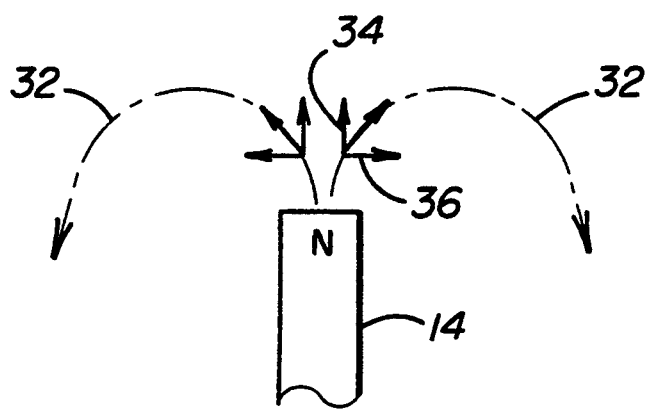

Referring still to FIG. 3 and to FIG. 3A, the vertical component or curve 28 in FIG. 3 results from movement of the magnetometer 24 from left to right (normal to the vehicle direction which is into or out of the paper) as it passes over a magnet 14 embedded in the pavement 12. As can be seen the lines of force 32 are represented as moving from the north pole to the south pole in the conventional manner. Breaking the line of force or vector 32 into its horizontal and vertical components 34 and 36 respectively, the vertical component 34 of the vector 32 is in the positive direction while the horizontal component 36 (with the magnetometer oriented as shown in FIG. 3) is in the negative direction. While movement of the magnetometer further to the left would theoretically reverse the vertical component 34, it has been shown by experimentation that deviation beyond a certain point, approximately 25 cm, from the magnets used in the present invention will result in a fall-off to the point there will be no signal received much beyond that point. Of course it is understood that stronger or larger magnets could increase this 25 cm distance.

In like manner, the horizontal component 36, goes from a positive indication on the left side of the magnet to a negative indication on the right side of the magnet.

Figure 3B:
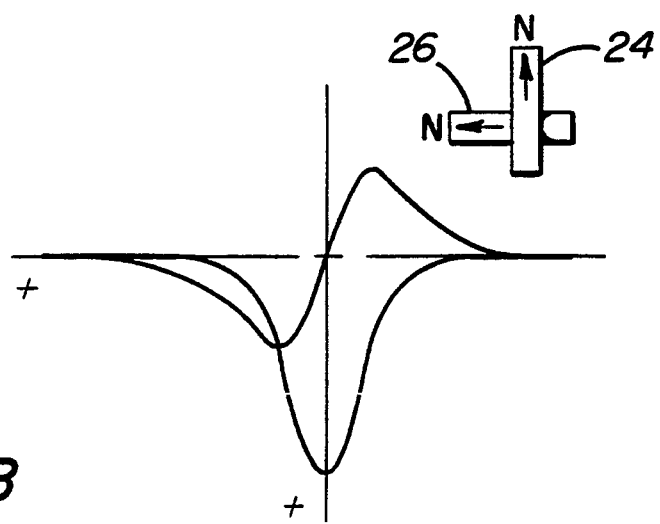
FIG. 3B is a representation of the force fields and force vectors of a magnet with the south pole placed in an uppermost position.
Figure 3B:
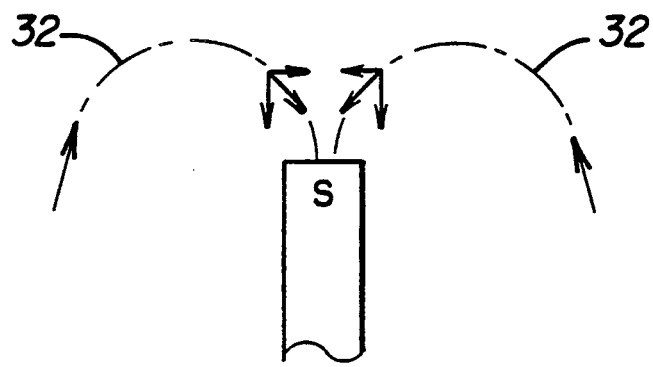

The purpose of this discussion is to show that the positioning of the two magnetometers 24 and 26 at right angles to one another and generally coincident with each other will result in intelligence to indicate which side of the magnetic marker 14 the magnetometers (and of course the vehicle) are on no matter whether the north pole of the magnet is up as shown in FIG. 3A, or whether the south pole is up as shown in FIG. 3B. An examination of FIGS. 3A and 3B will show that if the magnetometers, oriented as they are shown in FIGS. 3A and 3B, are to the left of the center line of the path of the embedded magnets 14 whether or not the north or south pole is oriented upwardly will result in polarity indications from the magnetometers of the same sign. In FIG. 3A wherein the north pole is up, the polarity indications would be positive or northward with the magnetometers to the left of the center line and in opposite directions, that is the vertical polarity will be positive and the horizontal polarity will be negative when the magnetometers are to the right of the center line. In a similar fashion the polarity indications of the magnetometers would be negative for the vertical component in FIG. 3B when the magnetometers are to the left, just as the horizontal polarity indication would be negative to the left of the center line of the magnets. When the magnetometers are moved to the right, the polarities are different, that is the horizontal polarity is positive and the vertical polarity is negative. This factor will be taken into account to determine the deviation to the right or the left of the line of magnets 14 in the path roadway 12.

Figure 2:
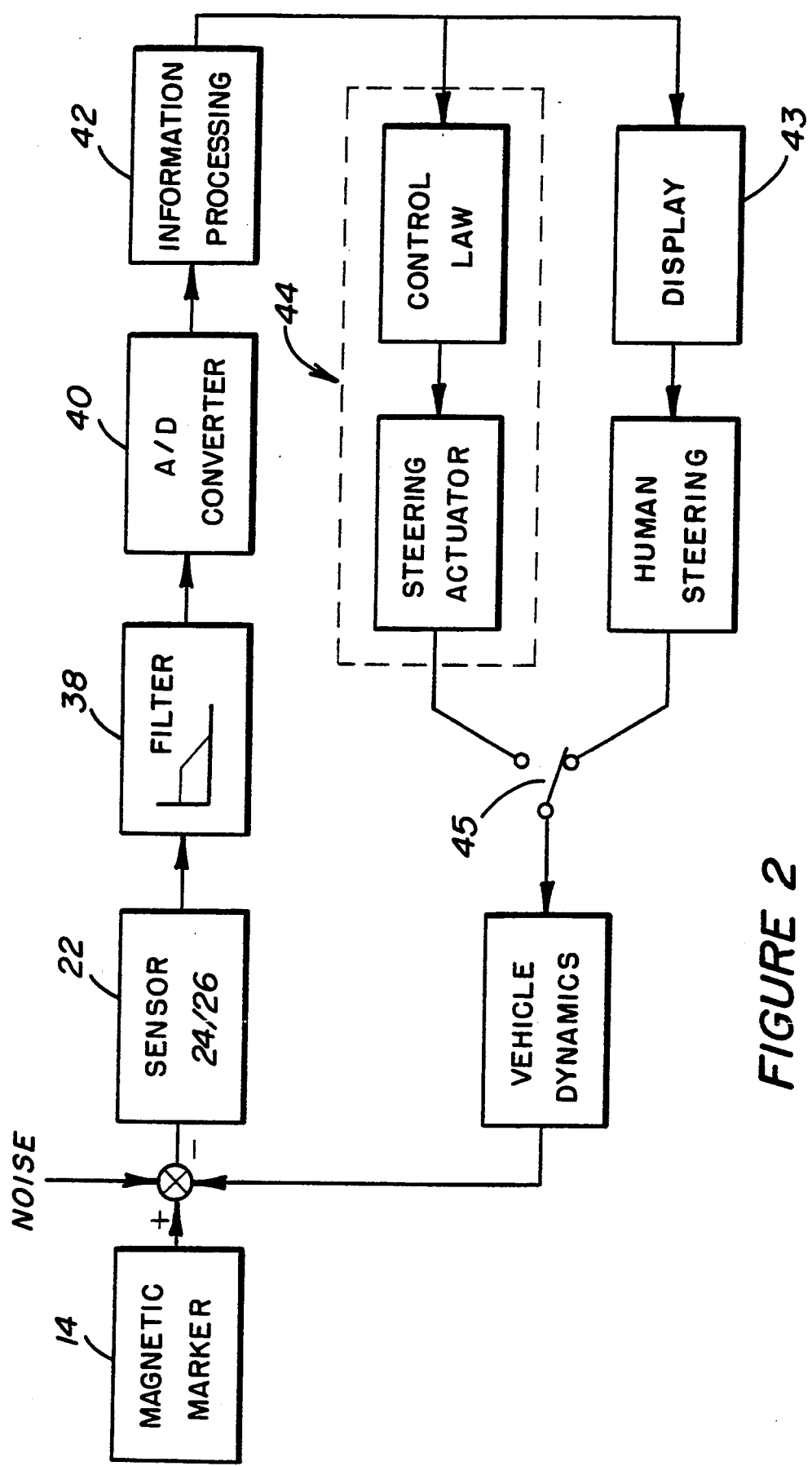
FIG. 2 is a block diagram of the magnetic sensing system in the vehicle.

Referring now to FIG. 2, the signals from the sensors or probes 24 and 26 (which are represented in FIG. 2 as a single sensor 22) are then filtered in a low pass filter 38. The purpose of the low pass filter 38 is to filter out noise in the form of high frequency magnetic fields generated by the various electrical and mechanical components of vehicle 10.

The resulting signal emanating from filter 38 is passed on to an analogue-to-digital converter 40 so that a digital signal may be passed to computer 42 for information processing. Computer 42 compares the horizontal and vertical components of the signals received as a vehicle passes over the embedded magnets 14 to determine first, whether the vehicle is to the right or the left of the center lines of the magnets 14 and second, to enter into a "table look-up" of the two field strengths to determine how far from the center line of the path the vehicle may be. Since the horizontal and vertical field strengths of the embedded magnets are relative, the underlying strength of the earth field must also be known. As will be shown, the earth's field is likewise determined when the probes are generally midway between two embedded magnets. In addition, the polar orientation of several contiguous magnets may be used to provide roadside geometry.

Figure 4:
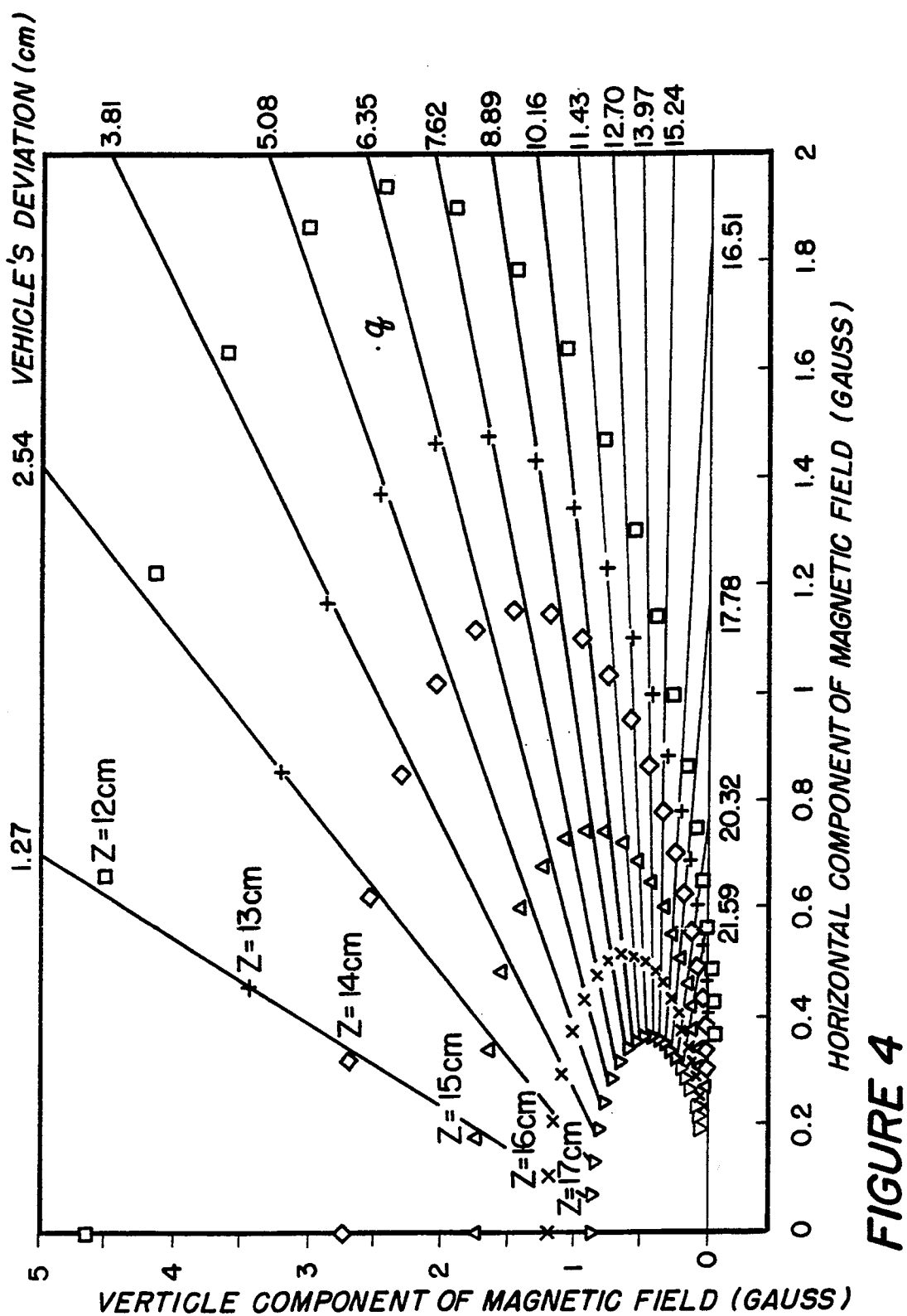
FIG. 4 is a graphical representation of the deviation of the pair of orthogonal magnetic force sensors from the center line of the pathway, such deviation determined by force strength.

Referring to FIG. 4, one can see the results of test data obtained from the measurement of the field strength of a series of magnets 14 placed in a pathway.

It is emphasized again that coil type sensors, which have been used in other magnetic sensing devices loose their capability as a vehicle speed approaches zero simply because such loop sensors must be moving through the magnetic field in order to determine the field strength. Magnetometer-type sensors, which are utilized herein, will operate at a stopped condition and thus are much more appropriate for the present embodiment.

Magnetometers which are appropriate for this invention are available from Macyntyre Electronic Design Associates at 11260 Roger Bacon Drive in Reston, Va. In like manner, the embedded magnets utilized herein are ceramic magnetic bars having a diameter of 2.5 cm and 10 cm long. In fact, four cylindrical magnets 2 1/5 cm in diameter and 2 ½ cm long are stacked one upon the other and placed in a bored hole in the pavement. The sensor, with the probes 24 and 26 is positioned on the vehicle somewhere between 10 and 20 cm above the pavement with preferred distance being approximately 15 cm.

It would be assumed that the vertical movement of the car due to the springing and the like would cause wide variations in field strength. It has been found however that the problem of vertical displacement sensitivity can be overcome following the reasoning set forth below.

If the lateral position from the center is denoted as Y then using the magnetic field or M-field, measurements can be accomplished by using the relationship between the vehicle's deviation and the magnetic field strength B as defined as $$y = F(B) \tag{1}$$

Efforts have been conducted to mathematically describe the M-field using the theory of magnetic fields. Several models have been developed. The simplest approach is to refer to a magnetic marker as a magnetic dipole, then the M-field B at an observation point P(x, y, z) is where $$B = \frac{\mu M}{4\pi r^5} (3xz a_x + 3yz a_y + (2z^2 - x^2 - y^2) a_z) \tag{2}$$

$$r = \sqrt{x^2 + y^2 + z^2}$$

$\mu$ is the permeability of free space
M is the magnetic moment

Equation (2) represents the M-field by its three components, $B_x$, $B_y$, $B_z$, therefore, the Equation can be expressed as $$B = (B_x, B_y, B_z) \tag{3}$$

where $B_x$ and $B_y$ are in the road surface and oriented tangent to and normal to the road center line respectively, while $B_z$ is perpendicular to the road surface. Analysis is focused on the M-field at x=0, where only two nonzero components exist, defined as the horizontal component $B_h(y,z) = B_y(0,y,z)$ and vertical component $B_y(y,z) = B_z(0,y,z)$, Let $s = B|_{x=0}$, then the M-field strength at $x=0$ is $$s = (B_h(y,z), B_v(y,z)) \quad (4)$$

and expression (1) can be rewritten as $$y = f(s) \quad (5)$$

FIG. 3 gives both the test data and the analytical predictions of the magnetic field components. It was found that the analysis result has slight deviations from the test data. These deviations would cause errors if the vehicle position processing were dependent on equation (2).

In order to derive (5), the properties of an input-output relationship of the function f were analyzed. Let S be a signal set, $S = \{2_i | s = (B_h(y,z), B_v(y,z))\}$, and U be a deviation set, $Y = \{y | (-y_{max} < y < y_{max})\}$. The function f can be interpreted as a rule which specifies a deviation y for each signal element s, that is, f maps $s \in S$ to a corresponding deviation $y \in Y$, written as $$f: S \rightarrow Y \quad (6)$$

The mapping relationship given in section (6) implies that any signal measurement s must have a unique deviation value $y \in Y$. A sensor that is located in the M-field, when $x=0$ and $y=y_i$, will acquire only one signal measurement $s_i = f(y_i)$ ($s_i \in S$). However, the signal $s_i$ may not be unique because of variations in the vertical displacement of the vehicle, which cause the sensor height to change. These variations s are bounded because of the limits of the vehicle suspension travel, therefore the signal s is within a certain range. If a signal subset $S_i \subset S$ could be defined, which includes all the possible signal measurements $s_i \in S_i$, then a map $f_i$ could be given as $$f_i: \text{if } s_i \in S_i \text{ then } y = y_i$$

The function $f_i$ denotes the transformation from $s_i$ to $y_i$. If the vehicle deviation value is digitized and $y = \{y_1, y_2, \ldots Y_n | Y_1 = y_{max}, y_n = y_{max}\}$, function f can be specified by a set of rules $f = (f_i)$. Clearly, this approach provides an alternative algorithm for solving the problem by defining the signal subsets $S_i$.

The signal subset $S_i$ can be specified by defining the domain of the subset. Suppose that a plane specified by $B_h(y_i, Z)$ and $B_v(y_i, z)$ exists, then all the signal measurements $s_i$ will constitute a curve on the plane when the height of the sensor varies from 8 cm to 20 cm (the allowable vertical displacement). This curve is called the s curve and is given by $$B_v(y_i, z) = g(B_h(y_i, z))$$

An optimal fit of the s curve can be found by a regression of samples of the measurements which gives $$\hat{B} = g'(a_1, a_2, \ldots, a_k; B_h)$$

Conveniently, the s curve has very good linearity (FIG. 4 gives several s curves in the $B_h$-$B_v$ plane). Thus, $S_i$ can be defined as:

$$S_i = \{s_i | s_i \text{ is defined by } \hat{B}_v(y_1, z) = a_1 \cdot B_h(y_i, z) + b_i\}$$

where $a_i$ and $b_i$ can be calculated directly from the empirical data by regression.

After obtaining the signal subsets, a set of rules $\{f_i\}$, which cover the complete sensing range, can be defined. The rule $f_i$ is rewritten as $$f_i: \text{when } B_h = B_{hi}, \text{ if } \hat{B}_{vi+1} < B_v < \hat{B}_{vi} \text{ then}$$
$$y_{i+1} < y_i (i=,2,\ldots n)$$

By applying these rules, an algorithm can be constructed which finds each acquired signal $s_i$ its belonging subset $S_i$, and then transforms it to a lateral deviation value. For instance, when $s_q = (B_{hg}, B_{vg})$ is acquired, based on $B_{hg}$, the algorithm calculates $B_v(5 \text{ cm}, z) < B_{vg} < \hat{B}_v(6.3 \text{ cm}, z)$ is reached. This indicates that the vehicle's deviation is in a range between 5 cm and 6.3 cm as shown by the letter q in FIG. 4.

Figure 5A:
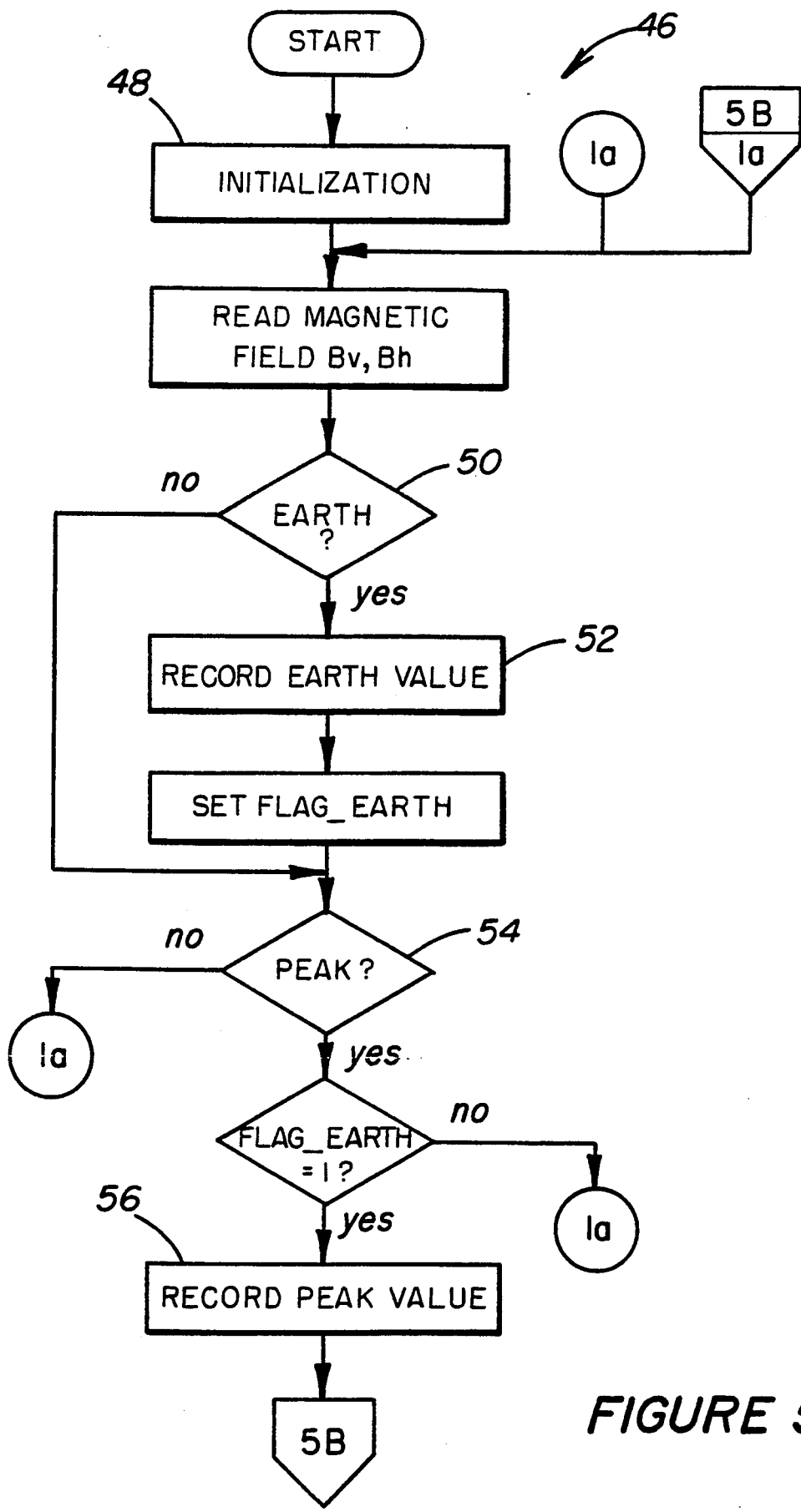
FIGS. 5A-5C are flow charts representative of the computer program used to provide vehicle guidance/control.
Figure 5B:
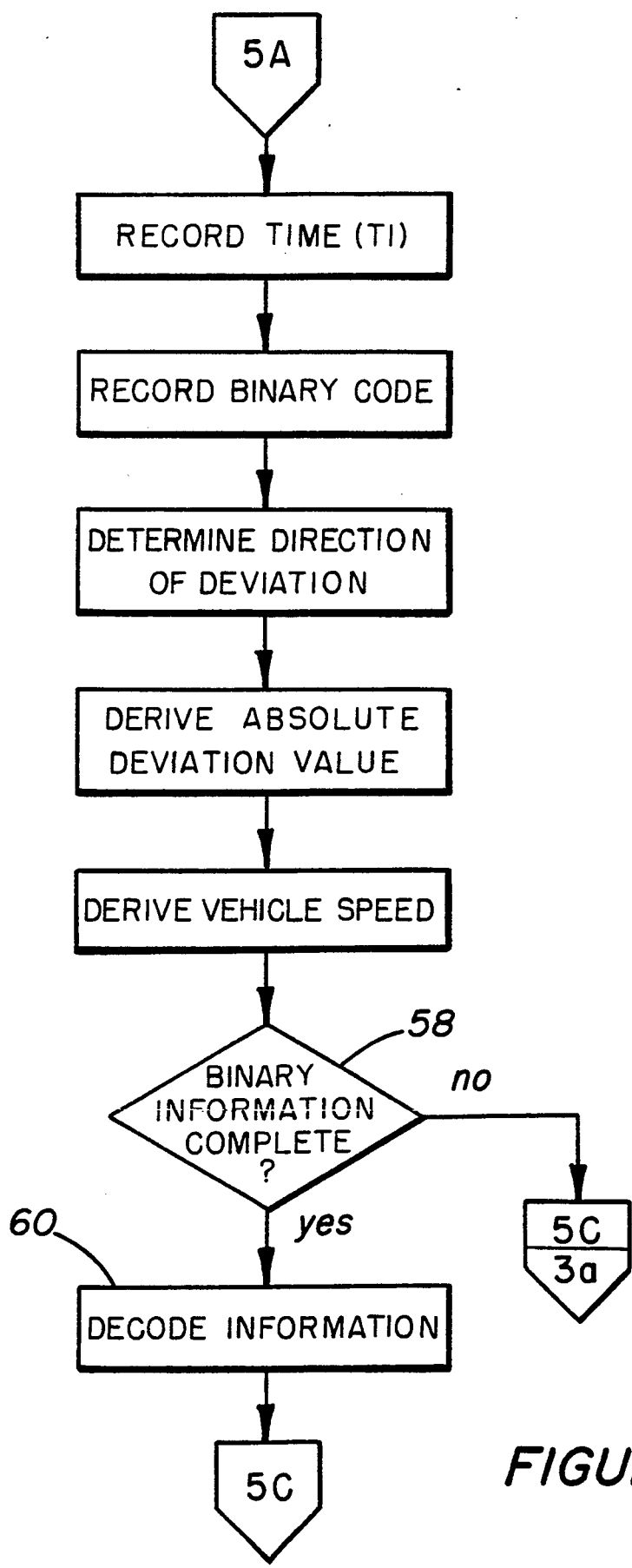
Figure 5C:
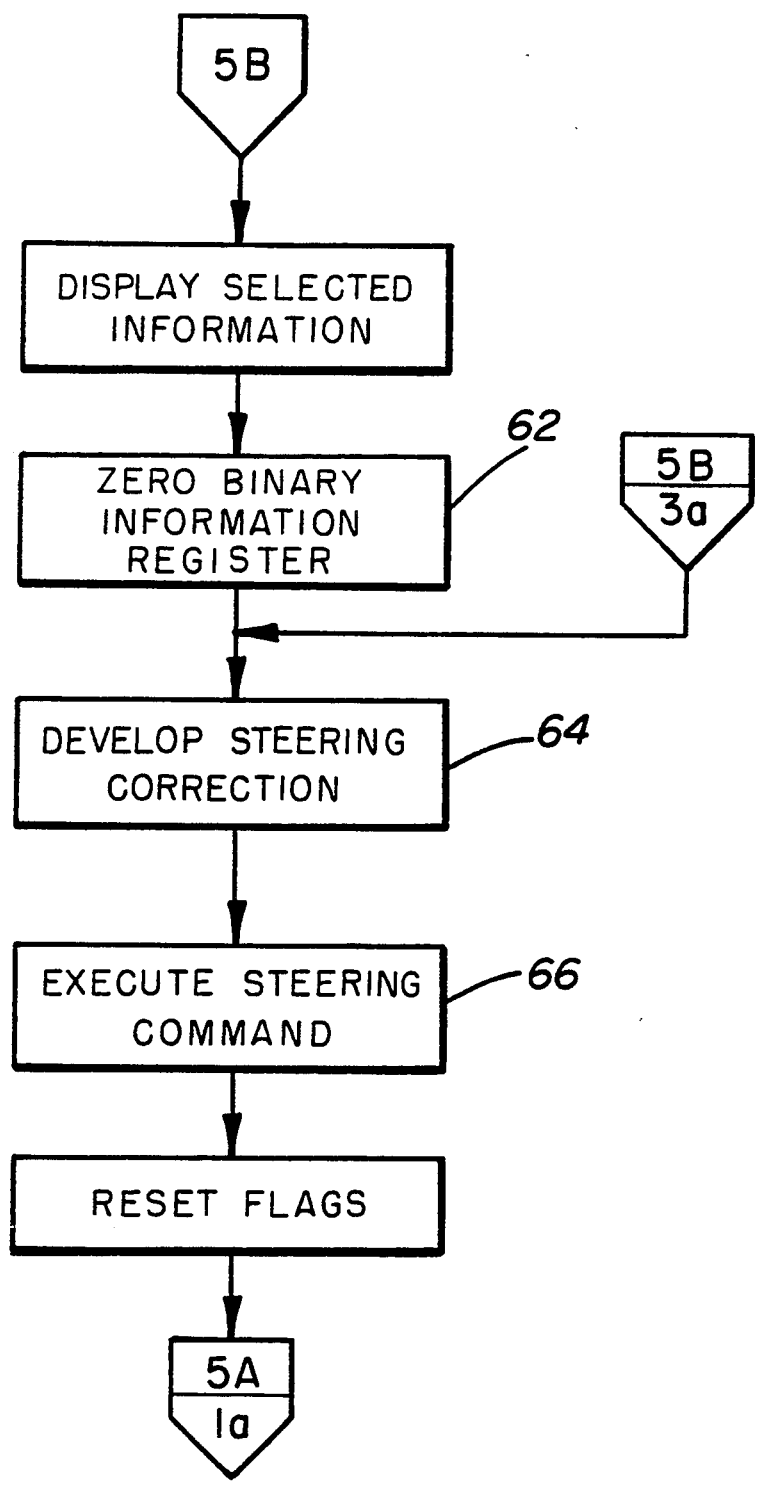

FIGS. 5A through 5C are a flow chart of a representative computer program that may be used in computer 42 to receive and process the signals from the analog-to-digital converter 40 and then pass on the information to the steering control unit 44 or for display on a visual display tube 43 for human intervention. Switch 45, shown in FIG. 2 is operative to actuate automatic steering by the steering actuator 44 or to permit human steering based on the visual display.

Program 46 starts with an initializing operation 48 which can include ordinary housekeeping functions of any micro-computer-type operation including an automatic execution of the impending program.

Once the program is in operation, then based on command from the computer the magnetometers 24 and 26 each read the magnetic field Bh and Bv that is the horizontal and vertical components first of the earth's field as indicated in decision block 50. The purpose of establishing the earth field is so that the background information caused by the earth's magnetic field is known before the variations or more properly anomalies in the earth's field caused by passing over the magnets 14 can be determined. The earth field is determined by noting over a period of time, i.e., clock cycles, that the horizontal and vertical components have remained unchanged. Once this occurs then the earth value is recorded as indicated at block 52 and a flag set to indicate that the earth value has been established. Since the field strength of the embedded magnets effectively drops to zero 25 cm from the magnet, a separation of 1 meter between embedded magnets 14 gives more than adequate time to establish the earth field. If, on the other hand, at decision block 50 there are variations between two consecutive horizontal and vertical components then one jumps to decision block 54 to record the peak value of that variation, which variation then becomes the field strengths used to determine deviation.

Referring back to FIG. 3A, one should envision travelling into the paper thus the z component of the magnetic field comes into effect. As one approaches the axis of the magnet, the vertical component 28 will rise in the same manner as shown in FIG. 3A. Thus, the three dimensional relationship of the magnetic field is in effect symmetrical. Once the peak value is reached, it is apparent that the vehicle and its associated sensing unit is at its closest point of approach to an individual magnet 14, which in this instance would be on a line normal to the axis of magnet 14 or immediately above magnet 14. This peak value, if an earth field has been determined, will be recorded and as indicated in operation block 56, along with the time taken from the computer clock. Simultaneously a peak flag is set to one and the polarity of both the horizontal and vertical magnetometers are recorded to determine the direction, right or left of center line, the binary value of the magnet (as previously explained) with reference to FIGS. 3A and 3B. Following the determination of the polarity of the embedded magnet, the relative values of the field strength are then compared to a table look-up based on the material included in FIG. 4. Once this is determined, the amount of deviation right or left of the center line is determined. Reference is made to the section above describing FIG. 4 wherein the location q is found to be between 5 and 6.3 cm from the center line of the desired path.

Passing on to FIG. 5B, the drive speed V may be determined by comparing the times between the recording the peak values as previously noted. It has been found in practice that three to four magnets should be passed in determining the speed due to variations in placement of the magnets.

The next step is to determine if the binary information encoded in the serially embedded magnets is complete as indicated in decision block 58. This can be accomplished in one of several manners. A predetermined word length can be utilized so that passage of eight or sixteen or thirty-two magnets would indicate a word which may take on a certain function or, alternatively, a coded character set can be developed so that distance to a turn will be represented in one manner and the length of the turn in a second manner. This type of information is described as road geometry information and may be required for example, to preview curves.

In this embodiment, road curves are represented with several parameters. A circular curve, is represented by its radius of curvature while a spiral curve, which usually leads into a circular curve, can be specified by a transition parameter which gives the relationship between the radius of curvature and the distance in the spiral section. Several parameters such as the length, direction and elevation of curvature are generally applied to all types of horizontal curves.

The amount of information to be provided to a sensing system such as described herein depends on the required precision of information. For example, eight bits of information can represent a 1275 meter radius with a precision of five meters while it may represent a 255 meter radius with one meter precision. In a system such as envisioned herein, it is appropriate to not only use a conventional header code to indicate the type of information that is forthcoming but also error detection and correction codes. Such codes are relatively well-known in the art having been first defined by R. W. Hamming and as a consequence taking on the term Hamming codes. Most commonly known are the parity bits utilized in information transfer in practically every computer manufactured today. As is also well-known in the computer science field, additional check bits can be added to the coding structure to correct up to a certain of number errors. Suffice it to say that in this application error correcting can be accomplished in two manners. First, additional bits can be added to the word for detection and correction of errors in the manner of Hamming and secondly, redundancy can be built-in into the system. By redundancy it is meant that the road geometry information can be repeated two or three times. Thus, as a vehicle approaches a turn the road geometry information including the radius, the direction of the turn, and the length of the turn will be provided to the vehicle for example, three times. Should there be inconsistencies between all three receptions, a warning signal can be transmitted to the vehicle operator or the vehicle slowed and ultimately halted. On the other hand, if a match occurs, control of the vehicle may continue to take place. Again it is pointed out that the magnets are placed with the north or south pole up depending upon representation of either a binary one or a binary zero. The information is then passed in serial fashion to the on-board computer for the decoding as indicated in FIG. 5B, block 60.

Subsequent to decoding, the decoded information may be displayed to the operator on a video display terminal 43 mounted in the vehicle. In addition to road geometry, such information as speed limit, stop lights or the like and other road information may be provided for appropriate control of the vehicle.

Once the information is decoded and checked, the binary information register should be zeroed (operation block 62) while the decoded information is passed on to the operating section of the computer to develop steering corrections and subsequently execute the steering commands (operation blocks 64 and 66). Finally, the flags are reset to zero and the program returned to read the next magnetic field from the next subsequent magnet.

It has been found that a spacing of one meter between the magnets in the road is sufficient to provide information for operating speeds up to 100k. For example, a curve having a radius of 1097 meters and the length of 709 meters requires less than 50 bits of binary code if the desired precisions for radius and length are one meter. Eleven bits are used for representing radius, ten bits are used for representing the length and twenty-five bits are applied to headers in correction codes. Thus, in a space of less than fifty meters one can transmit the road information to the on-board computer. Further, it has been found that with a system utilizing a twenty megahertz clock there will be ample time for processing the information set forth above. Specifically, at 80k per hour the vehicle will pass slightly more than twenty-two markers per second. With the twenty megahertz clock there will be about 900,000 clock cycles per marker. In a standard microprocessor the average instruction takes between ten and twelve clock cycles to execute. Thus there is adequate time to process a large number of instructions between each marker without overpowering the system.

OPERATION OF THE PREFERRED EMBODIMENT

It should be apparent to those skilled in the art how this system operates however, for clarity the following points are made.

The system is envisioned for being used with a vehicle 10 being equipped with the sensor 22. Vehicle 10 passes over a series of magnetic markers 14 embedded in the roadway. The magnetic markers 14 are oriented so that coded information can be passed to the on-board computer system using the principals set forth above. Specifically, if the magnet is oriented with the north pole facing upwardly then it represents a binary 1 while if it is placed with the south pole facing upwardly it represents a binary 0.

As a vehicle passes down the roadway or pathway, the sensor 22 records first the earth field, which can include magnetic influence from the vehicle, and then records the anomaly to the earth field caused by each individual embedded magnet 14. Both the vertical and horizontal field strength is recorded so that subsequent operations in the on-board computer 42 can determine the deviation right or left from the center line of the roadway. Concurrently, information is decoded based on the binary information in the embedded magnetic markers for the control and guidance of the vehicle. Computer generated steering commands based on deviation and on road geometry are used to guide the vehicle along the desired marked path.

Variations in the pathway can be accomplished simply by removing a series of magnetic markers and relocating the pathway to a different route. In like manner, lane information can be embedded into the roadway so that a vehicle is apprised of which lane in a multi-laned roadway it is operating in. This facilitates positioning the vehicle for an upcoming exit. For example, if the vehicle were operating in the center lane and there was a required right lane exit in a three-laned road, the vehicle could be easily moved rightwardly to exit at the appropriate exit point. The invention is considered particularly useful and appropriate where lane marker or roadway boundaries are covered by rain or snow.

While this invention has been described in relation to a particular embodiment, it is not to be so considered, rather it is to be limited only by the following claims.

I claim:

1. A direction sensing method for controlling the lateral displacement of a vehicle moving along a pathway having embedded therein a series of magnetic markers, the method comprising the steps of:
   positioning a first magnetic field sensor in the vehicle for determining a vertical component of the magnetic field strength at one of the magnetic markers;
   positioning a second magnetic field sensor in the vehicle for determining a horizontal component of the magnetic field strength at the same one of the magnetic markers; and
   correlating said determined vertical and horizontal components of the magnetic field strength to obtain the lateral displacement of the vehicle.

2. The sensing method according to claim 1, further including the steps of:
   measuring the earth magnetic field between two successive magnetic markers, so that background information caused by the earth magnetic field is determined;
   recording the peak values of the magnetic marker strength relative to the earth field; and
   correlating the recorded peak values, and the vertical and horizontal components of the magnetic field strength of the magnetic markers to the vehicle lateral displacement according to a predetermined mapping relationship, for minimizing potential errors caused by signal distortions due to the vehicle vertical motion.

3. A vehicle direction sensing system for a lateral control of the vehicle moving along a pathway, the system comprising:
   a series of magnetic markers each having a magnetic field associated therewith said markers embedded along a predetermined line in said pathway so that a vehicle traveling along said path will pass over said markers one after the other;
   a first magnetic field strength sensing means positioned in said vehicle for determining the vertical component of the magnetic field strength at one of said discrete magnetic markers;
   a second magnetic field strength sensing means positioned in said vehicle for determining the horizontal component normal to the pathway of the field strength of the same one of said discrete magnetic markers;
   computer means for comparing the vertical component of the magnetic field strength and the horizontal component of the magnetic field strength of the one of the magnetic markers to obtain the lateral displacement of the vehicle from the predetermined line.

4. The system of claim 3 further including:
   steering means responsive to said computer means for steering said vehicle back to the predetermined line whereby the lateral displacement from said predetermined line is reduced.

5. The system of claim 3 wherein each of said magnetic markers is oriented in said path with its magnetic axis normal to the road service and further when the north pole of the magnet is up the magnet represents a binary one and when the south pole of the magnet is up the magnet represents a binary zero.

6. The system of claim 3 wherein each of said magnetic markers is oriented in said path with its magnetic axis normal to the path surface and further wherein the positioning of the north pole of the magnet in relation to the path surface determines whether the magnet represent a binary one or a binary zero.

7. The system of claim 6 wherein the computer means further includes program means to translate the magnetic field data of each magnetic marker into a binary one or a binary zero depending upon the orientation of the magnetic marker relative to the path surface.

8. The system of claim 7 wherein the geometry of the pathway includes curved sections and straight sections and wherein a plurality of serially adjacent embedded magnetic markers in the pathway are oriented so that binary information received therefrom provides information regarding forthcoming pathway geometry.

9. The system of claim 8 wherein the plurality of serially adjacent embedded magnetic markers in the pathway further includes information to detect and correct at least some errors caused by incorrect translation of magnetic field data.

10. The system of claim 8 wherein the information regarding forthcoming pathway geometry includes identification of a curve, radius of curvature of the curve distance to the curve and length of the curve.

11. The system of claim 10 wherein the information regarding forthcoming pathway geometry is repeated at least two times.

12. The system of claim 11 wherein the information regarding forthcoming pathway conditions includes error detection and correction codes.

13. The system of claim 12 wherein said magnetic markers are separated by one meter.

14. The system of claim 13 further including speed sensing means for sensing the vehicle speed.

15. The system of claim 14 wherein said speed sensing means comprises a magnetic field sensing device, a clock and program means for determining the speed of the vehicle.

16. The system of claim 10 further including speed sensing means for sensing the vehicle speed.

17. The system of claim 8 wherein the computer means includes program means to generate steering commands to guide the vehicle based on information regarding forthcoming pathway geometry, and;
   steering means responsive to said computer means and said steering commands for steering said vehicle back to the predetermined line whereby the lateral displacement from said predetermined line is reduced and said forthcoming pathway geometry are met by said steering commands.

18. The system of claim 17 wherein the vehicle includes an operator's station for operation of said vehicle by a human, the system including:
   visual display means in communication with said computer means for displaying the lateral displacement of said vehicle from the predetermined line and further for displaying forthcoming pathway geometry, whereby a human operating said vehicle may take appropriate corrective action.

19. The system of claim 18 further including switch means for providing a first condition whereby said vehicle is steered by said steering means and a second condition whereby said vehicle is steered in response to a human operator.

20. The system of claim 8 wherein the vehicle includes an operator's station for operation of said vehicle by a human, the system including:
   visual display means in communication with said computer means for displaying the lateral displacement of said vehicle from the predetermined line and further for displaying forthcoming pathway geometry, whereby a human operating said vehicle may take appropriate corrective action.

21. The system of claim 3 wherein the first and second magnetic field strength sensing means are positioned adjacent one to the other.

22. The system of claim 3 wherein the vehicle includes an operator's station for operation by a human being and the system further including:
   visual display means in communication with said computer means for displaying the lateral displacement of the vehicle in the operator's station whereby a human being may take corrective action to reduce the lateral displacement of said vehicle from said predetermined line.

23. The sensing system according to claim 3, further including means for measuring the earth magnetic field so that background information caused by the earth magnetic field is determined.

24. The sensing system according to claim 23, wherein the earth magnetic field is measured between two successive magnetic markers.

25. The sensing system according to claim 23, wherein said computer means includes means for recording the peak values of the magnetic marker strength relative to the earth field, and for correlating the vertical and horizontal components of the magnetic field strength of the magnetic markers to the vehicle lateral displacement.

26. The sensing system according to claim 25, wherein the correlation is carried out according to a predetermined mapping relationship.

27. A vehicle direction sensing system for use with discreet magnetic markers, each magnetic marker having a magnetic field associated therewith and embedded along a predetermined line in a pathway, the system comprising:
   a first magnetic field strength sensing means positioned in said vehicle for determining the vertical component normal to the pathway of the magnetic field strength at one of said discrete magnetic markers;
   a second magnetic field strength sensing means positioned in said vehicle for determining the horizontal component of the field strength of the same one of said discrete magnetic markers;
   computer means for comparing the vertical component of the magnetic field strength and the horizontal component of the magnetic field strength of the one of the magnetic markers to obtain the lateral displacement of the vehicle from the predetermined line.

28. The system of claim 27 further including:
   steering means responsive to said computer means for steering said vehicle back to the predetermined line whereby the lateral displacement from said predetermined line is reduced.

29. The sensing system according to claim 1, wherein said computer means for comparing correlates the vertical and the horizontal components of the magnetic field strength of said one of the magnetic markers, in a predetermined mapping relationship, to obtain the lateral displacement of the vehicle.

* * * * *